(12) United States Patent
Nordvall et al.

(10) Patent No.: US 11,780,093 B2
(45) Date of Patent: Oct. 10, 2023

(54) METHOD OF CONTROLLING INDUSTRIAL ACTUATOR, CONTROL SYSTEM, AND INDUSTRIAL ACTUATOR SYSTEM

(71) Applicant: ABB Schweiz AG, Baden (CH)

(72) Inventors: Martin Nordvall, Västerås (SE); Jonas Brönmark, Västerås (SE); Håkan Fortell, Västerås (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 18/040,698

(22) PCT Filed: Aug. 13, 2020

(86) PCT No.: PCT/EP2020/072779
§ 371 (c)(1),
(2) Date: Feb. 6, 2023

(87) PCT Pub. No.: WO2022/033693
PCT Pub. Date: Feb. 17, 2022

(65) Prior Publication Data
US 2023/0211503 A1    Jul. 6, 2023

(51) Int. Cl.
*B25J 9/16*    (2006.01)
(52) U.S. Cl.
CPC .................................. *B25J 9/1689* (2013.01)
(58) Field of Classification Search
CPC .................. B25J 9/1689; B25J 9/1651; G05B 2219/39439
See application file for complete search history.

(56) References Cited

U.S. PATENT DOCUMENTS

| 4,055,787 A | 10/1977 | Beadle et al. |
| 8,641,663 B2* | 2/2014 | Kirschenman ..... A61B 17/2909 |
| | | 604/95.01 |

(Continued)

FOREIGN PATENT DOCUMENTS

| CN | 101278244 A | 10/2008 |
| CN | 106041968 A | 10/2016 |

(Continued)

OTHER PUBLICATIONS

International Preliminary Report on Patentability; Application No. PCT/EP2020/072779; Completed: May 26, 2021; 40 Pages.

(Continued)

*Primary Examiner* — Robert T Nguyen
(74) *Attorney, Agent, or Firm* — WHITMYER IP GROUP LLC (57) ABSTRACT

A method of controlling an industrial actuator, the method including receiving a manual input in the form of a displacement of an input element; in response to the manual input being a displacement of the input element from the neutral position in a first input direction, controlling the industrial actuator to move in a forward direction along a movement path and with a speed corresponding to a magnitude or a speed of the displacement from a neutral position; and in response to the manual input being a displacement of the input element from the neutral position in a second input direction, controlling the industrial actuator to move in a backward direction along the movement path and with a speed corresponding to a magnitude or a speed of the displacement from the neutral position.

19 Claims, 7 Drawing Sheets

(56) References Cited

U.S. PATENT DOCUMENTS

| | | | |
|---|---|---|---|
| 2017/0028549 A1 | 2/2017 | Battisti | |
| 2018/0101166 A1 | 4/2018 | Aldridge et al. | |
| 2021/0059777 A1* | 3/2021 | Overmyer | A61B 17/00 |
| 2022/0168167 A1* | 6/2022 | Xie | A61H 23/02 |

FOREIGN PATENT DOCUMENTS

| | | |
|---|---|---|
| CN | 108700868 A | 10/2018 |
| CN | 109153121 A | 1/2019 |
| EP | 1772879 A2 | 4/2007 |
| EP | 1772879 A3 | 4/2009 |
| JP | S60146691 A | 8/1985 |
| JP | 2009279725 A | 12/2009 |
| WO | 2007025928 A1 | 3/2007 |

OTHER PUBLICATIONS

International Search Report and Written Opinion of the International Searching Authority; Application No. PCT/EP2020/072779; Completed: Mar. 30, 2021; dated Apr. 13, 2021; 14 Pages.
Chinese First Office Action and Search Report; Application No. 202080104164.2; dated Jul. 6, 2023; 9 Pages.

\* cited by examiner

METHOD OF CONTROLLING INDUSTRIAL ACTUATOR, CONTROL SYSTEM, AND INDUSTRIAL ACTUATOR SYSTEM

TECHNICAL FIELD

The present disclosure generally relates to industrial actuators. In particular, a method of controlling an industrial actuator, a control system for controlling an industrial actuator, and an industrial actuator system comprising an industrial actuator and a control system, are provided.

BACKGROUND

An industrial robot system typically comprises an industrial robot, a control system (e.g. a robot controller) for controlling the operation of the industrial robot, and an operator control device, generally denoted a teach pendant unit (TPU), for manually controlling the industrial robot. The teach pendant unit is typically handheld.

A user may use the teach pendant unit to program the industrial robot to follow a movement path. In order to program or teach the industrial robot, the industrial robot may be jogged to target positions along the desired movement path. These target positions are stored as instructions in a computer program in a memory in the control system. During operation of the industrial robot, the computer program is executed, thereby making the industrial robot operate as desired. With the term "jogging" is meant that the industrial robot is moved under manual control of the user, for example by means of a joystick on the teach pendant unit.

Jogging can be performed in various motion modes. Examples of such motion modes are axis-by-axis motion modes, and coordinate system motion modes (e.g. locked in one or more planes). Both during commissioning and in production, a user may be required to jog the industrial robot to move to a desired position.

US 2018101166 A1 describes systems, methods, and devices related to robotic programming and motion control. A robotic device may determine a connection with a controller device, the controller device comprising one or more buttons and a pointing device. The device may identify one or more input locations associated with the controller device. The device may determine to follow a path of motion of the controller device based at least in part on the one or more input locations. The device may determine an indication of location transition associated with the controller device. The device may determine to transition an end effector of the robotic device to a first position in space relative to the location transition.

US 2017028549 A1 discloses a robotic navigation system including a handheld navigation unit. The handheld navigation unit includes an upper portion in the form of a knob that is pivotably connected to a lower base with a yoke extending between the knob and the base. Movement of the knob and the attached yoke along an X-axis results in a control signal that causes a robot to move a robot tip along the X-axis in a direction indicated by the user along a selected reference frame's coordinate system.

WO 2007025928 A1 discloses an industrial robot system comprising a manipulator, a control unit for controlling the manipulator, and a portable programming device for teaching, programming and manually operating a robot. The programming device comprises functionality for handling the robot in a production state and functionality for teaching and programming the robot.

EP 1772879 A2 discloses a live handle in the form of a hand operated safety switch for an industrial robot or a machine. The live handle comprises a safety certified switch for operating a robot or other machine safely while under manual control. The live handle switch may be comprised in a portable robot controller of the Teach Pendant unit type.

SUMMARY

In some situations, for example when a computer program has stopped for some reason, the user may want to run the computer program slowly both forward and backward to move an industrial robot to a desired position. In some prior art solutions, the user has to preselect a speed of the industrial robot when running the computer program. The user may for example select to execute the computer program at 10% of the programmed speed. In order to change the speed, the user has to make a further selection, e.g. via a software menu in a teach pendant unit, which may require a full stop of the industrial robot. This procedure is time consuming and not optimal from the user's perspective.

One object of the present disclosure is to provide an effective method of controlling an industrial actuator.

A further object of the present disclosure is to provide a user intuitive method of controlling an industrial actuator.

A still further object of the present disclosure is to provide a less complicated method of controlling an industrial actuator.

A still further object of the present disclosure is to provide an accurate method of controlling an industrial actuator.

A still further object of the present disclosure is to provide a method of controlling an industrial actuator, which method solves several or all of the foregoing objects in combination.

A still further object of the present disclosure is to provide a control system for controlling an industrial actuator, which control system solves one, several or all of the foregoing objects.

A still further object of the present disclosure is to provide an industrial actuator system solving one, several or all of the foregoing objects.

According to one aspect, there is provided a method of controlling an industrial actuator, the method comprising receiving a manual input in the form of a displacement of an input element, the input element being movable in each of a first input direction and a second input direction from a neutral position; in response to the manual input being a displacement of the input element from the neutral position in the first input direction, controlling the industrial actuator to move in a forward direction along a movement path and with a speed corresponding to a magnitude or a speed of the displacement from the neutral position; and in response to the manual input being a displacement of the input element from the neutral position in the second input direction, controlling the industrial actuator to move in a backward direction along the movement path and with a speed corresponding to a magnitude or a speed of the displacement from the neutral position.

The method thus enables a user to control both a direction (i.e. forward or backward) of the industrial actuator along the movement path, and a speed of the industrial actuator along the movement path directly with a single input element. The user does therefore not have to operate different buttons to effect the direction and speed control along the movement path. The method thereby enables a user to manually control an industrial robot to move forward and backward along a programmed movement path in a simple, intuitive and seamless manner. Since the user can rapidly change both the speed and the direction of the industrial actuator, the accuracy of the control is improved and the speed of the control is increased.

The method is for example valuable when the user needs to check a movement path, e.g. how close the industrial actuator is to an object. Sometimes the user may be unsure of whether or not the industrial actuator will collide with an object when executing the movement path. The reason for this may be that the movement path is programmed off-site. By means of the method, the user can control the industrial robot to move close to a critical section of the movement path with relatively high speed. Once the industrial robot is close to the critical section, the industrial robot can be controlled to alternatingly move forward and backward along the critical section with a relatively low speed. In this way, the user can obtain more accurate information regarding the quality of the movement path in a fast manner.

The possibility to rapidly change both the speed and the direction of the industrial actuator is also valuable in order to get out from a situation by manually reversing the industrial actuator along the movement path. By reversing "the way you came", it is possible to reduce a risk of getting stuck with the industrial actuator in a position and posture from which it is difficult to manually reverse by means of an axis-by-axis jogging mode or a coordinate system jogging mode (e.g. in an XY-plane).

The method thus provides a new type of jogging mode for the industrial actuator, different from an axis-by-axis jogging mode and a coordinate system jogging mode. This new type of jogging mode may be referred to as "jog on path".

The industrial actuator may be an industrial robot. The industrial robot may comprise a manipulator programmable in three or more axes.

The first input direction may be substantially opposite, or opposite, to the second input direction.

The movement path may comprise a plurality of target positions. The movement path may be determined based on the target positions. The movement path may for example comprise an interpolation between the target positions, such as a linear or spline interpolation. The movement path may be two dimensional or three dimensional.

A maximum speed may be set for the speed of the industrial actuator along the movement path when controlling the industrial actuator based on the input element.

The method may further comprise controlling the industrial actuator to move along the movement path in the forward direction; and recording a plurality of actual positions of the industrial actuator while moving along the movement path in the forward direction. In this case, the control of the industrial actuator to move in the backward direction along the movement path may comprise controlling the industrial actuator to move successively between the actual positions.

In some implementations, a computer program of the industrial actuator cannot be executed backward. The functionality to record the actual position may be referred to as a path recorder. This functionality may be activated by default when executing the computer program of the industrial actuator. According to one variant, a limited number of last actual positions are stored. For example, if the ten last actual positions are recorded, a first actual position may be deleted and an eleventh actual position may be recorded when the industrial actuator reaches an eleventh actual position along the movement path. The method may however comprise recording less than the ten last actual positions, or more than the ten last actual positions, such as at least the 20 last actual positions.

Each actual position may be a target position of the movement path. The movement path may however comprise alternative target positions that may not be reached by the industrial actuator. For example, the movement path may comprise a first target position, a second target position, a third target position and a fourth target position. When the industrial actuator moves forward along the movement path and reaches the first target position, it may be determined whether the industrial actuator should move to the fourth target position via the second target position or via the third target position. Such determination may be based on a conditional statement (such as an "if-statement") in the computer program of the industrial actuator. A wide range of such conditional statements are possible. Such conditional statements may be based on one or more states of an industrial environment in which the industrial actuator operates. If the industrial actuator moves to the second target position, the second target position (but not the third target position) is recorded as an actual position, and if the industrial actuator moves to the third target position, the third target position (but not the second target position) is recorded as an actual position.

The industrial actuator may comprise a plurality of axes, and each actual position of the industrial actuator may comprise an axis position for each axis. A movement of the industrial actuator between two adjacent actual positions may involve both one or more translational movements and one or more rotational movement of axes of the industrial actuator.

In many cases, it is practically impossible to reverse the industrial actuator by means of an axis-by-axis jogging mode. However, when the actual positions of the industrial actuator also comprise recorded axis positions, the industrial actuator will reverse its previous forward movement when moving backward along the movement path. This concept is distinct from when a tool center point (TCP) of an industrial robot follows the movement path, which can often be done with a wide range of different axis positions for each target position of the movement path.

The method may further comprise stopping the industrial actuator in response to the input element being in the neutral position. If the industrial actuator is controlled to move along the movement path based on the manual input of the input element, the user can stop this movement by positioning the input element in the neutral position. Alternatively, or in addition, the method may further comprise stopping the industrial actuator in response to a speed of the input element being zero.

The input element may be a joystick, a slider, or a knob. The input element may be configured to automatically return to the neutral position upon release of the input element.

In case the input element is a joystick, the user may for example move the joystick to the right to cause the industrial actuator to move forward along the movement path. The more the joystick is moved to the right, the faster the industrial actuator moves forward along the movement path. Correspondingly, the user may move the joystick to the left to cause the industrial actuator to move backward along the movement path, e.g. as long as there is a recorded path of actual positions. The more the joystick is moved to the left, the faster the industrial actuator moves backward along the movement path.

The above description of the joystick may also apply for a slider and/or a knob. The slider may be either a physical slider or implemented in a touch screen. Also the knob may be either a physical knob or implemented in a touch screen.

The input element may be linearly movable in each of the first input direction and the second input direction from the neutral position. Alternatively, the input element may be rotatable in each of the first input direction and the second input direction from the neutral position.

The method may further comprise receiving a manual activation input, and activating the control of the industrial actuator in response to receiving the manual activation input. In this way, an automatic execution of the movement path by the industrial actuator can be interrupted by a user to switch to the control of the industrial actuator by means of the input element according to this aspect.

The method may further comprise receiving a manual resuming input, and controlling the industrial actuator to move from a current position along the movement path in accordance with a computer program in response to receiving the manual resuming input. With current position is meant a position in which the industrial actuator is currently positioned.

The method may further comprise automatically activating the control of the industrial actuator when the industrial actuator experiences a collision. Various ways to determine whether the industrial actuator experiences a collision are possible. Examples include monitoring of motors in the axes, vibration monitoring and sound monitoring.

The method may further comprise automatically activating the control of the industrial actuator when the industrial actuator stops within a safe zone. The industrial actuator may be automatically controlled to stop if it enters the safe zone. A safe zone may be defined as a volume within the workspace of the industrial actuator. The user may then control the industrial actuator to move along the movement path within the safe zone by means of the input element.

The method may further comprise visualizing the movement path, and at least one of the forward direction and the backward direction in association with the movement path. In this way, the user is informed of how the industrial actuator will move when the input element is actuated.

The method may further comprise visualizing the movement path, the forward direction, the backward direction, the first input direction and the second input direction. In any case, the visualization may be performed on a display, for example on a display of a teach pendant unit.

The method may further comprise displaying a mode indicator specific for the control of the industrial actuator according to this aspect when the control is activated. For example, the text "jog on path" and/or a symbol may be displayed to inform the user that the industrial actuator will move along the movement path by displacement of the input element.

Alternatively, or in addition, the method may further comprise receiving a mode selection from a user, and controlling the industrial actuator in response to the mode selection. The mode selection may be a selection among a group of modes comprising a control of the industrial actuator according to this aspect, one or more axis-by-axis motion modes, and one or more coordinate system motion modes.

According to a further aspect, there is provided a control system for controlling an industrial actuator, the control system comprising at least one data processing device and at least one memory having a computer program stored thereon, the at least one computer program comprising program code which, when executed by the at least one data processing device, causes the at least one data processing device to perform any method step according to the first aspect.

The at least one computer program may comprise program code which, when executed by the at least one data processing device, causes the at least one data processing device to perform the steps of determining, based on a signal associated with a displacement of an input element, whether the input element has been displaced in a first input direction or in a second input direction from a neutral position, and a magnitude or a speed of the displacement from the neutral position; in response to determining that the input element has been displaced in the first input direction, controlling the industrial actuator to move in a forward direction along a movement path and with a speed corresponding to the magnitude or the speed of the displacement from the neutral position; and in response to determining that the input element has been displaced in the second input direction, controlling the industrial actuator to move in a backward direction along the movement path and with a speed corresponding to the magnitude or the speed of the displacement from the neutral position.

The input element and the industrial actuator may be of any type according to the present disclosure. The control system may be configured to control the industrial actuator in any way according to the present disclosure.

The at least one computer program may comprise program code which, when executed by the at least one data processing device, causes the at least one data processing device to perform the steps of controlling the industrial actuator to move along the movement path in the forward direction; and recording a plurality of actual positions of the industrial actuator while moving along the movement path in the forward direction; wherein the control of the industrial actuator to move in the backward direction along the movement path comprises controlling the industrial actuator to move successively between the actual positions.

The at least one computer program may comprise program code which, when executed by the at least one data processing device, causes the at least one data processing device to perform the steps of determining, based on the signal associated with the input element, that the input element is in the neutral position; and stopping the industrial actuator in response to the determination that the input element is in the neutral position.

The at least one computer program may comprise program code which, when executed by the at least one data processing device, causes the at least one data processing device to perform the steps of receiving a signal associated with a manual activation input; and activating the control of the industrial actuator in response to receiving the signal associated with the manual activation input.

The at least one computer program may comprise program code which, when executed by the at least one data processing device, causes the at least one data processing device to perform the steps of receiving signal associated with a manual resuming input; and controlling the industrial actuator to move from a current position along the movement path in accordance with a program in response to receiving the signal associated with the manual resuming input.

The at least one computer program may comprise program code which, when executed by the at least one data processing device, causes the at least one data processing device to perform the steps of determining if the industrial actuator experiences a collision; and automatically activating the control of the industrial actuator by means of the input element in response to the determination that the industrial actuator has experienced a collision.

The at least one computer program may comprise program code which, when executed by the at least one data processing device, causes the at least one data processing device to perform the steps of determining whether the industrial actuator stops within a safe zone; and automatically activating the control of the industrial actuator by means of the input element in response to the determination that the industrial actuator has stopped within the safe zone.

The at least one computer program may comprise program code which, when executed by the at least one data processing device, causes the at least one data processing device to perform the step of commanding visualization of the movement path, and at least one of the forward direction and the backward direction in association with the movement path.

The at least one computer program may comprise program code which, when executed by the at least one data processing device, causes the at least one data processing device to perform the step of commanding visualization of the movement path, the forward direction, the backward direction, the first input direction and the second input direction.

According to a further aspect, there is provided an industrial actuator system comprising a control system according to the present disclosure and an industrial actuator. The industrial actuator may be an industrial robot. The industrial robot may comprise a manipulator programmable in three or more axes. The industrial actuator may comprise a plurality of axes, and each actual position of the industrial actuator may comprise an axis position for each axis.

The industrial actuator system may further comprise the input element. The input element may be a joystick, a slider, or a knob.

The input element may be linearly movable in each of the first input direction and the second input direction from the neutral position. Alternatively, the input element may be rotatable in each of the first input direction and the second input direction from the neutral position.

The industrial actuator system may further comprise a teach pendant unit. The teach pendant unit may comprise the input element. The industrial actuator system may further comprise a touch screen. The input element may be implemented in the touch screen. The touch screen may or may not be provided in the teach pendant unit.

BRIEF DESCRIPTION OF THE DRAWINGS

Further details, advantages and aspects of the present disclosure will become apparent from the following description taken in conjunction with the drawings, wherein:

FIG. 3b: schematically represents the behavior of the industrial actuator in response to the displacement of the input element in FIG. 3a;

FIG. 4b: schematically represents the behavior of the industrial actuator in response to the displacement of the input element in FIG. 4a;

FIG. 5b: schematically represents the behavior of the industrial actuator in response to the input element being in the neutral position according to FIG. 5a;

FIG. 6b: schematically represents the behavior of the industrial actuator in response to the displacement of the input element in FIG. 6a;

FIG. 7b: schematically represents the behavior of the industrial actuator in response to the displacement of the input element in FIG. 7a;

FIG. 9b: schematically represents a different speed of displacement of the input element in FIG. 9a;

DETAILED DESCRIPTION

In the following, a method of controlling an industrial actuator, a control system for controlling an industrial actuator, and an industrial actuator system comprising an industrial actuator and a control system, will be described. The same or similar reference numerals will be used to denote the same or similar structural features.

Figure 1:
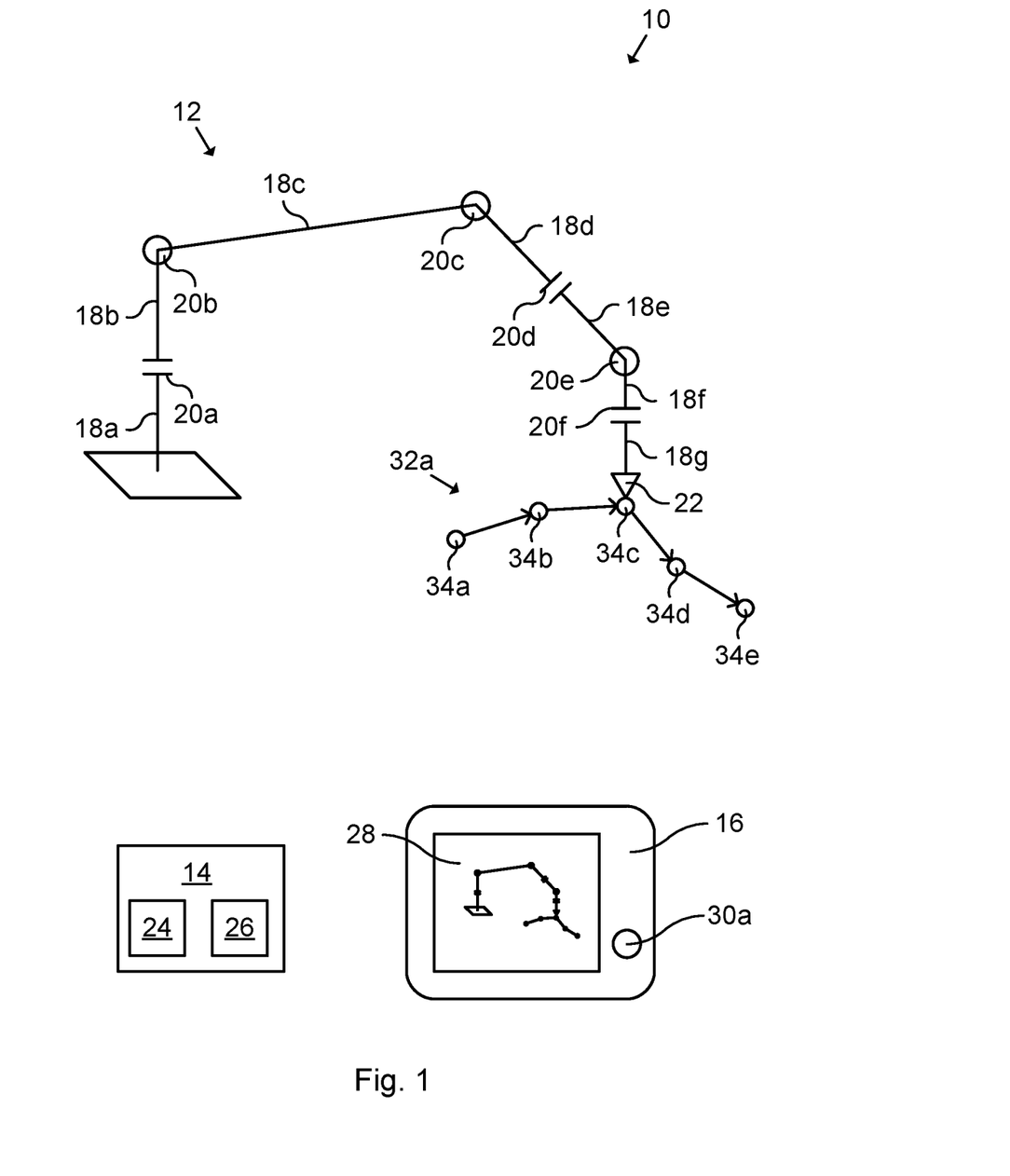
FIG. 1: schematically represents an industrial actuator system and a movement path for an industrial actuator.

FIG. 1 schematically represents an industrial robot system 10 comprising an industrial robot 12. The industrial robot system 10 and the industrial robot 12 are examples of an industrial actuator system and an industrial actuator, respectively, according to the present disclosure. The industrial robot system 10 further comprises a control system 14 and a teach pendant unit 16.

The industrial robot 12 of this specific example comprises a first link 18a, a second link 18b rotatable relative to the first link 18a at a first axis 20a, a third link 18c rotatable relative to the second link 18b at a second axis 20b, a fourth link 18d rotatable relative to the third link 18c at a third axis 20c, a fifth link 18e rotatable relative to the fourth link 18d at a fourth axis 20d, a sixth link 18f rotatable relative to the fifth link 18e at a fifth axis 20e, and a seventh link 18g rotatable relative to the sixth link 18f at a sixth joint 20f. One, several or all of the links 18a-18g may also be referred to with reference numeral "18". One, several or all of the axes 20a-20b may also be referred to with reference numeral "20".

The industrial robot 12 further comprises an end effector 22. The end effector 22 of this example is rigidly connected to the seventh link 18g.

The industrial robot 12 in FIG. 1 is however only one of many examples. The industrial robot 12 may for example also comprise one or more translational joints.

The control system 14 of this example comprises a data processing device 24 and a memory 26. The memory 26 comprises a computer program containing program code, which when executed by the data processing device 24, causes the data processing device 24 to execute, or command execution of, various steps as described herein.

The teach pendant unit 16 comprises a touch screen display 28. The display 28 does however not necessarily need to be provided in the teach pendant unit 16. The display 28 may for example alternatively be provided in a personal computer (not shown).

The teach pendant unit 16 comprises one or more input devices for manually controlling the motions of the industrial robot 12. The teach pendant unit 16 also comprises safety equipment such as an enabling device and an emergency stop button. The teach pendant unit 16 is connected to the control system 14 to enable communication between the teach pendant unit 16 and the control system 14. The connection can be wireless or through a cable.

The teach pendant unit 16 in FIG. 1 comprises a joystick 30a. The joystick 30a is one example of an input element according to the present disclosure. The joystick 30a of this example is a mechanical joystick.

The industrial robot 12 is programmed to move along a movement path 32a. In this example, the end effector 22 follows the movement path 32a. The movement path 32a comprises a plurality of target positions 34a-34e. One, several or all of the target positions 34a-34e may also be referred to with reference numeral "34".

In each target position 34, a position for each axis 20 is defined. In FIG. 1, the industrial robot 12 is positioned in the third target position 34c. This means that not only is the end effector 22 positioned in the third target position 34c, but the industrial robot 12 is positioned with a defined posture in the third target position 34c.

The movement path 32a further comprises a plurality of movement segments (not denoted). Each movement segment is defined between two target positions 34. The movement segments may for example be linear interpolations or spline interpolations between the target positions 34.

Figure 2:
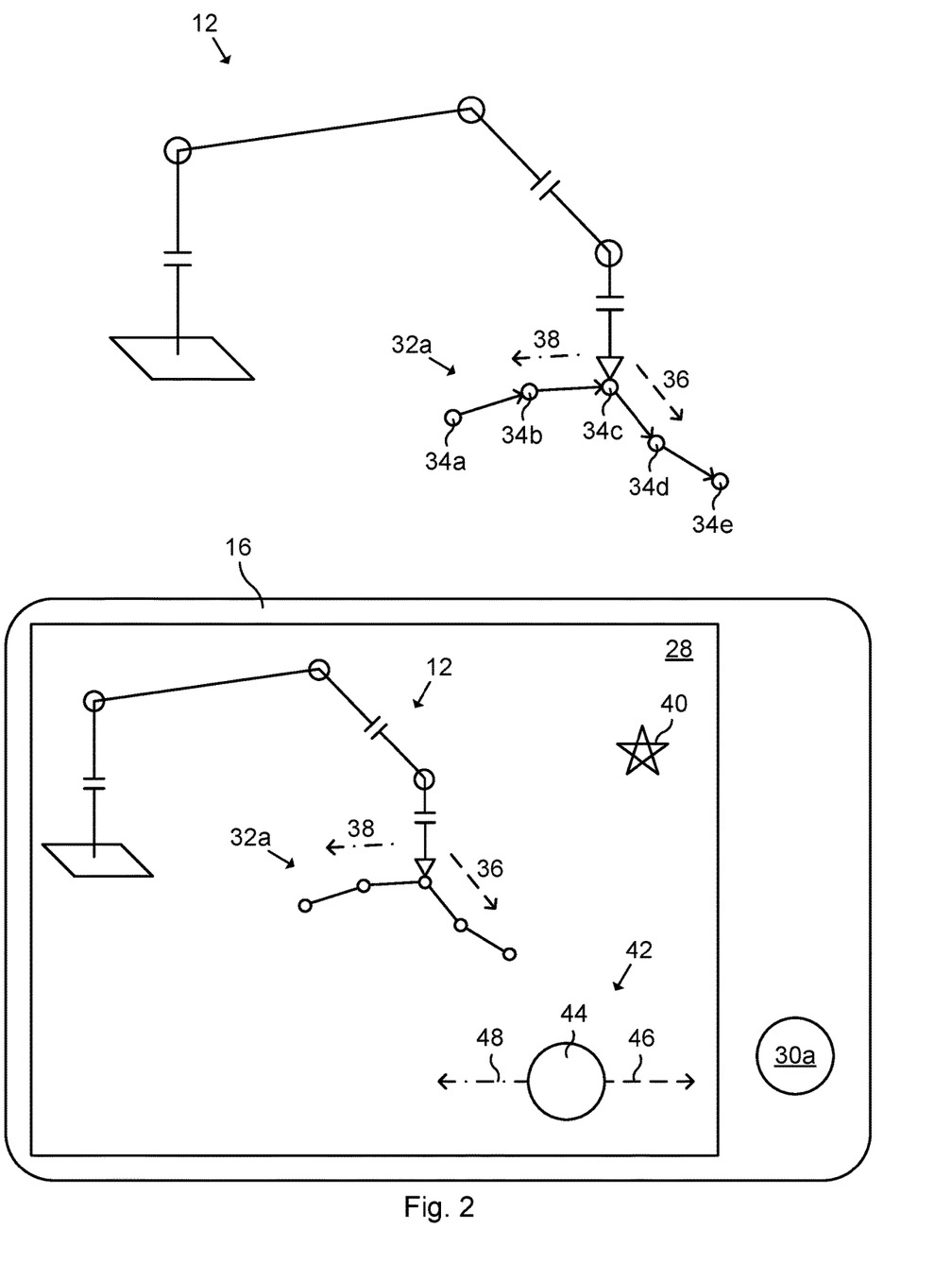
FIG. 2: schematically represents an industrial actuator and a teach pendant unit of the industrial actuator system.

FIG. 2 schematically represents the industrial robot 12 and the teach pendant unit 16 of the industrial robot system 10. In FIG. 2, the industrial robot 12 is controlled by means of the joystick 30a. The industrial robot 12 can be controlled to move in a forward direction 36 or in a backward direction 38 along the movement path 32a.

The scenario illustrated in FIG. 2 is a new type of jogging mode that may be referred to as "jog on path". To this end, a mode indicator 40 is displayed on the display 28. The mode indicator 40 is here exemplified as a symbol but may alternatively be a text string. The user thereby knows that the jogging mode "jog on path" is activated. The user may input a mode selection to the teach pendant unit 16 to activate this jogging mode.

The industrial robot 12, the movement path 32a, the forward direction 36 and the backward direction 38 are also displayed on the display 28. Moreover, a symbol 42 representing the joystick 30a is also displayed on the display 28. The symbol 42 shows a neutral position 44 of the joystick 30a, a first input direction 46 of the joystick 30a, and a second input direction 48 of the joystick 30a. The joystick 30a is thus manually movable in the first input direction 46 from the neutral position 44, and in the second input direction 48 from the neutral position 44. As shown in FIG. 2, the first input direction 46 and the forward direction 36 are illustrated with common design features, here dashed arrows. The second input direction 48 and the backward direction 38 are illustrated with common design features, here dash-dotted arrows. The design features may alternatively, or in addition, comprise colors.

The information provided on the display 28 according to FIG. 2 thereby makes clear to the user that by manually moving the joystick 30a in the first input direction 46, the industrial robot 12 moves in the forward direction 36 along the movement path 32a, and by manually moving the joystick 30a in the second input direction 48, the industrial robot 12 moves in the backward direction 38 along the movement path 32a.

In this example, each of the first input direction 46 and the second input direction 48 is linear. Moreover, the second input direction 48 is opposite to the first input direction 46.

Figure 3A:
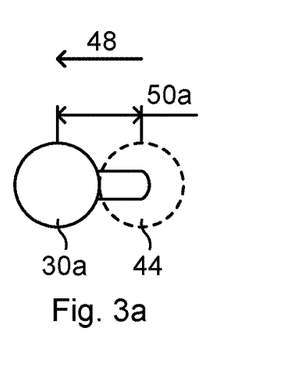
FIG. 3a: schematically represents a displacement of an input element in a second input direction.

FIG. 3a schematically represents a displacement 50a of the joystick 30a in the second input direction 48. As shown in FIG. 3a, a magnitude of the displacement 50a of the joystick 30a in the second input direction 48 is relatively large.

Figure 3B:
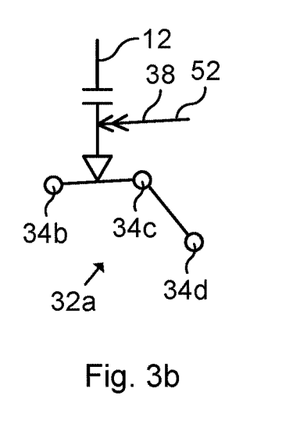

FIG. 3b schematically represents the behavior of the industrial robot 12 in response to the displacement 50a of the joystick 30a in FIG. 3a. As shown in FIG. 3b, the industrial robot 12 is controlled to move in the backward direction 38 along the movement path 32a with a relatively high speed 52 (indicated with the two headed arrow) in response to the displacement 50a of the joystick 30a in the second input direction 48.

Figure 4A:
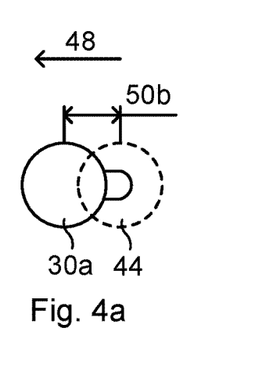
FIG. 4a: schematically represents a different displacement of the input element in the second input direction.

FIG. 4a schematically represents a different displacement 50b of the joystick 30a in the second input direction 48. As shown in FIG. 4a, a magnitude of the displacement 50b of the joystick 30a in the second input direction 48 is relatively small, i.e. smaller than the displacement 50a in FIG. 3a.

Figure 4B:
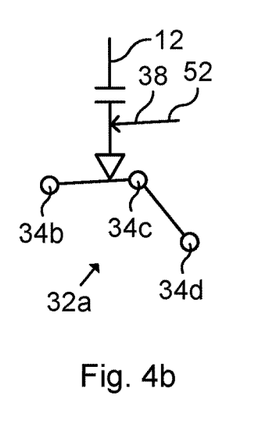

FIG. 4b schematically represents the behavior of the industrial robot 12 in response to the displacement 50b of the joystick 30a in FIG. 4a. As shown in FIG. 4b, the industrial robot 12 is controlled to move in the backward direction 38 along the movement path 32a with a relatively low speed 52

(indicated with the one headed arrow) in response to the displacement 50b of the joystick 30a in the second input direction 48.

Figure 5A:
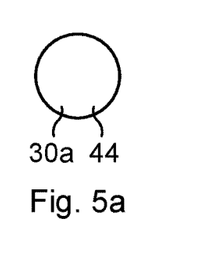
FIG. 5a: schematically represents the input element in a neutral position.
Figure 5B:
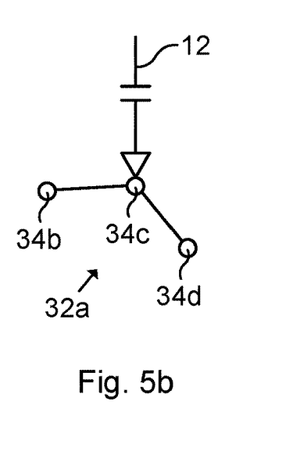

FIG. 5a schematically represents the joystick 30a in a neutral position 44. FIG. 5b schematically represents the behavior of the industrial robot 12 in response to the joystick 30a being in the neutral position 44 according to FIG. 5a. When the joystick 30a is in the neutral position 44, the industrial robot 12 is stopped. In case the industrial robot 12 is controlled to move along the movement path 32a, for example by the control according to FIGS. 3a-4b, the industrial robot 12 is stopped at a current position along the movement path 32a when the joystick 30a returns to the neutral position 44. The joystick 30a of this example is biased into the neutral position 44, for example by means of one or more springs (not shown).

Figure 6A:
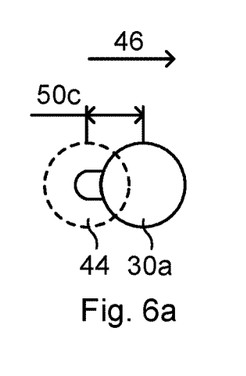
FIG. 6a: schematically represents a displacement of the input element in a first input direction.

FIG. 6a schematically represents a displacement 50c of the joystick 30a in the first input direction 46. As shown in FIG. 6a, a magnitude of the displacement 50c of the joystick 30a in the first input direction 46 is relatively small.

Figure 6B:
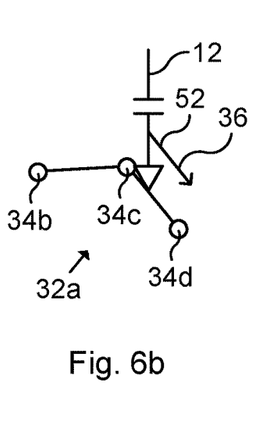

FIG. 6b schematically represents the behavior of the industrial robot 12 in response to the displacement 50c of the joystick 30a in FIG. 6a. As shown in FIG. 6b, the industrial robot 12 is controlled to move in the forward direction 36 with a relatively low speed 52 (indicated with the one headed arrow) in response to the displacement 50c of the joystick 30a in the first input direction 46.

Figure 7A:
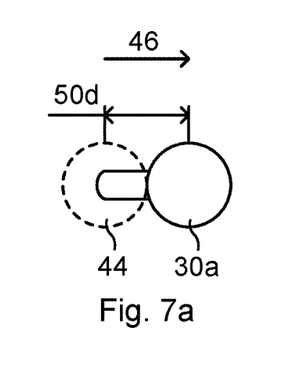
FIG. 7a: schematically represents a different displacement of the input element in the first input direction.

FIG. 7a schematically represents a different displacement 50d of the joystick 30a in the first input direction 46. As shown in FIG. 7a, a magnitude of the displacement 50d of the joystick 30a in the first input direction 46 is relatively large, i.e. larger than the displacement 50c in FIG. 6a. One, several or all of the displacements 50a-50d may also be referred to with reference numeral "50".

Figure 7B:
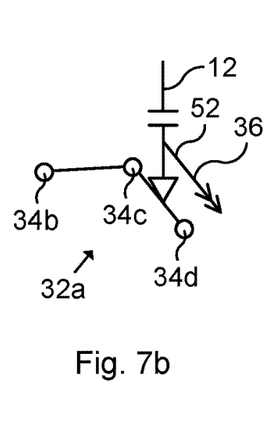

FIG. 7b schematically represents the behavior of the industrial robot 12 in response to the displacement 50d of the joystick 30a in FIG. 7a. As shown in FIG. 7b, the industrial robot 12 is controlled to move in the forward direction 36 along the movement path 32a with a relatively high speed 52 (indicated with the two headed arrow) in response to the displacement 50d of the joystick 30a in the first input direction 46. The speed 52 may be substantially linearly proportional to, or proportional to, the magnitudes of the displacements 50 of the joystick 30a from the neutral position 44.

The control of the industrial robot 12 along the movement path 32a in accordance with FIGS. 3a-7b enables the user to easily control the industrial robot 12 to move back and forth along the movement path 32a and with desired speeds 52, with a single input element. This is advantageous for several reasons. The user can for example control the industrial robot 12 to move with a high speed 52 to a critical section of the movement path 32a. Once in the critical section, the user can control the industrial robot 12 to alternatingly and seamlessly move back and forth with slow speeds 52 to study the behavior, e.g. to see how the programmed movement path 32a can be improved.

The method may employ a lower threshold value for the displacements 50 such that the industrial robot 12 is not controlled to move in response to displacements 50 below the lower threshold value. Alternatively, or in addition, the method may employ an upper threshold value for the displacements 50 such that in response to displacements 50 above the upper threshold value, the industrial robot 12 is controlled to move with a speed 52 corresponding to the upper threshold value. Thus, a maximum speed 52 may be set for the industrial robot 12 when being controlled to move along the movement path 32a by means of the joystick 30a. According to one example, the upper threshold value may correspond to 100% of a maximum allowed speed 52 of the industrial robot 12 when being controlled to move along the movement path 32a by means of the joystick 30a, and the lower threshold value may correspond to 5% of the maximum allowed speed 52.

Figure 8A:
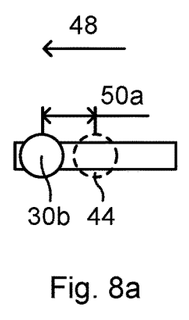
FIG. 8a: schematically represents a displacement of an alternative input element in a second input direction.

FIG. 8a schematically represents a displacement 50a of a slider 30b in the second input direction 48. The slider 30b is a further example of an input element according to the present disclosure. The slider 30b of this example is a software slider presented on the display 28 and manually manipulatable via the display 28. The slider 30b is by means of software configured to automatically return to the neutral position 44 upon release of the slider 30b.

The magnitude of the displacement 50a of the slider 30b in the second input direction 48 in FIG. 8a is relatively large. The industrial robot 12 is thereby controlled to move with a relatively high speed 52 in the backward direction 38 along the movement path 32a.

Figure 8B:
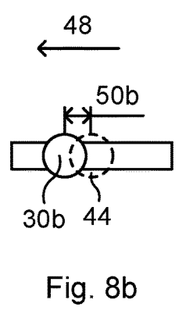
FIG. 8b: schematically represents a different displacement of the input element in FIG. 8a in the second input direction.

FIG. 8b schematically represents a different displacement 50b of the slider 30b in the second input direction 48. The magnitude of the displacement 50b of the slider 30b in FIG. 8b is relatively small, i.e. smaller than the magnitude of the displacement 50a in FIG. 8a. The industrial robot 12 is thereby controlled to move with a relatively low speed 52 in the backward direction 38 along the movement path 32a.

Figure 8C:
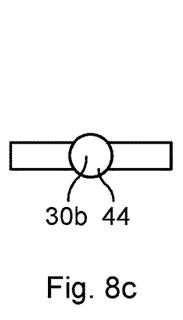
FIG. 8c: schematically represents the input element in FIGS. 8a and 8b in a neutral position.

FIG. 8c schematically represents the slider 30b in a neutral position 44.

Figure 8D:
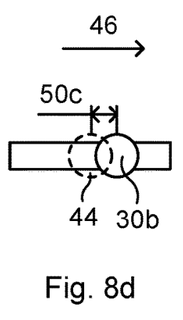
FIG. 8d: schematically represents a displacement of the input element in FIGS. 8a-8c in a first input direction.

FIG. 8d schematically represents a displacement 50c of the slider 30b in a first input direction 46. The magnitude of the displacement 50c of the slider 30b in the first input direction 46 in FIG. 8d is relatively small. The industrial robot 12 is thereby controlled to move with a relatively low speed 52 in the forward direction 36 along the movement path 32a.

Figure 8E:
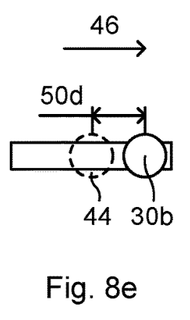
FIG. 8e: schematically represents a different displacement of the input element in FIGS. 8a-8d in the first input direction.

FIG. 8e schematically represents a different displacement 50d of the slider 30b in the first input direction 46. The magnitude of the displacement 50d of the slider 30b in the first input direction 46 in FIG. 8e is relatively large, i.e. larger than the displacement 50c in FIG. 8d. The industrial robot 12 is thereby controlled to move with a relatively high speed 52 in the forward direction 36 along the movement path 32a.

Also in the example in FIGS. 8a-8e, each of the first input direction 46 and the second input direction 48 is linear. Moreover, the second input direction 48 is opposite to the first input direction 46.

Figure 9A:
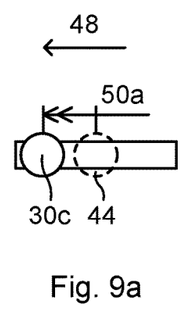
FIG. 9a: schematically represents a displacement of an alternative input element in a second input direction.

FIG. 9a schematically represents a displacement 50a of a further example of a slider 30c in the second input direction 48. The slider 30c is a further example of an input element according to the present disclosure. Also the slider 30c of this example is a software slider presented on the display 28 and manually manipulatable via the display 28. The slider 30c of this example does not automatically return to the neutral position 44 upon release of the slider 30c.

The speed of the displacement 50a of the slider 30c in the second input direction 48 in FIG. 9a is relatively high (as indicated by the two headed arrow). The industrial robot 12 is thereby controlled to move with a relatively high speed 52 in the backward direction 38 along the movement path 32a.

Figure 9B:
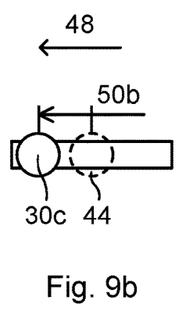

FIG. 9b schematically represents a different speed of a displacement 50b of the slider 30c in the second input direction 48. The speed of the displacement 50b of the slider 30c in FIG. 9b is relatively low (as indicated by the one headed arrow), i.e. lower than the speed of the displacement 50a in FIG. 9a. The industrial robot 12 is thereby controlled to move with a relatively low speed 52 in the backward direction 38 along the movement path 32a.

Figure 9C:
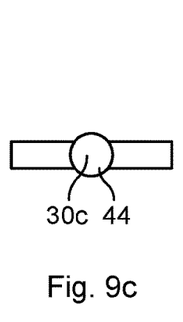
FIG. 9c: schematically represents the input element in FIGS. 9a and 9b in a neutral position.

FIG. 9c schematically represents the slider 30c in FIGS. 9a and 9b in a neutral position 44.

Figure 9D:
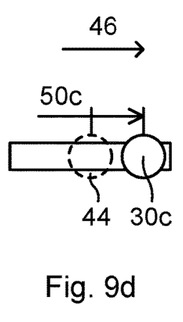
FIG. 9d: schematically represents a displacement of the input element in FIGS. 9a-9c in a first input direction.

FIG. 9d schematically represents a displacement 50c of the slider 30c in FIGS. 9a-9c in the first input direction 46. The speed of the displacement 50c of the slider 30c in the first input direction 46 in FIG. 9d is relatively low (as indicated by the one headed arrow). The industrial robot 12 is thereby controlled to move with a relatively low speed 52 in the forward direction 36 along the movement path 32a.

Figure 9E:
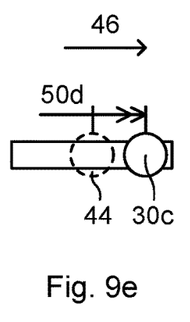
FIG. 9e: schematically represents a different speed of displacement of the input element in FIGS. 9a-9d in the first input direction.

FIG. 9e schematically represents a different speed of displacement 50d of the slider 30c in FIGS. 9a-9d in the first input direction 46. The speed of the displacement 50d of the slider 30c in the first input direction 46 in FIG. 9e is relatively high (as indicated by the two headed arrow), i.e. higher than the speed of the displacement 50c in FIG. 9d. The industrial robot 12 is thereby controlled to move with a relatively high speed 52 in the forward direction 36 along the movement path 32a.

The slider 30c in FIGS. 9a-9e does not necessarily have to be moved along a straight line. According to one example, the slider 30c can be moved along a path presented on the display 28 that represents the movement path 32a. In this way, the user may drag the slider 30c back and forth along the presented path with a desired speed to cause the industrial robot 12 to move correspondingly along the movement path 32a. The industrial robot 12 may be stopped when the speed of the slider 30c is zero.

Figure 10A:
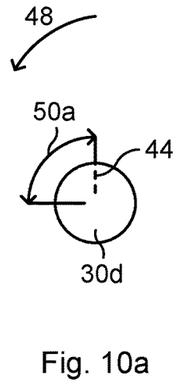
FIG. 10a: schematically represents a displacement of an alternative input element in a second input direction.

FIG. 10a schematically represents a displacement 50a of a knob 30d in the second input direction 48. The knob 30d is a further example of an input element according to the present disclosure. The knob 30d of this example is a mechanical knob. The knob 30d of this example is biased into the neutral position 44, for example by means of one or more springs (not shown).

The magnitude of the displacement 50a of the knob 30d in the second input direction 48 in FIG. 10a is relatively large. The industrial robot 12 is thereby controlled to move with a relatively high speed 52 in the backward direction 38 along the movement path 32a.

Figure 10B:
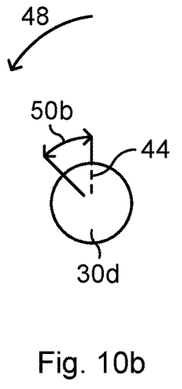
FIG. 10b: schematically represents a different displacement of the input element in FIG. 10a in the second input direction.

FIG. 10b schematically represents a different displacement 50b of the knob 30d in the second input direction 48. The magnitude of the displacement 50b of the knob 30d in FIG. 10b is relatively small, i.e. smaller than the magnitude of the displacement 50a in FIG. 10a. The industrial robot 12 is thereby controlled to move with a relatively low speed 52 in the backward direction 38 along the movement path 32a.

Figure 10C:
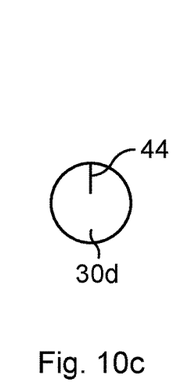
FIG. 10c: schematically represents the input element in FIGS. 10a and 10b in a neutral position.

FIG. 10c schematically represents the knob 30d in a neutral position 44.

Figure 10D:
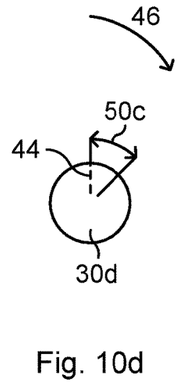
FIG. 10d: schematically represents a displacement of the input element in FIGS. 10a-10c in a first input direction.

FIG. 10d schematically represents a displacement 50c of the knob 30d in a first input direction 46. The magnitude of the displacement 50c of the knob 30d in the first input direction 46 in FIG. 10d is relatively small. The industrial robot 12 is thereby controlled to move with a relatively low speed 52 in the forward direction 36 along the movement path 32a.

Figure 10E:
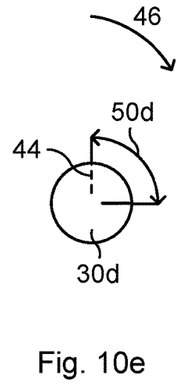
FIG. 10e: schematically represents a different displacement of the input element in FIGS. 10a-10d in the first input direction.

FIG. 10e schematically represents a different displacement 50d of the knob 30d in the first input direction 46. The magnitude of the displacement 50d of the knob 30d in the first input direction 46 in FIG. 10e is relatively large, i.e. larger than the displacement 50c in FIG. 10d. The industrial robot 12 is thereby controlled to move with a relatively high speed 52 in the forward direction 36 along the movement path 32a.

In the example in FIGS. 10a-10e, each of the first input direction 46 and the second input direction 48 is circular.

Thus, the knob 30d is rotatable from the neutral position 44 in each of the first input direction 46 and the second input direction 48. Moreover, the second input direction 48 is opposite to the first input direction 46.

Figure 11:
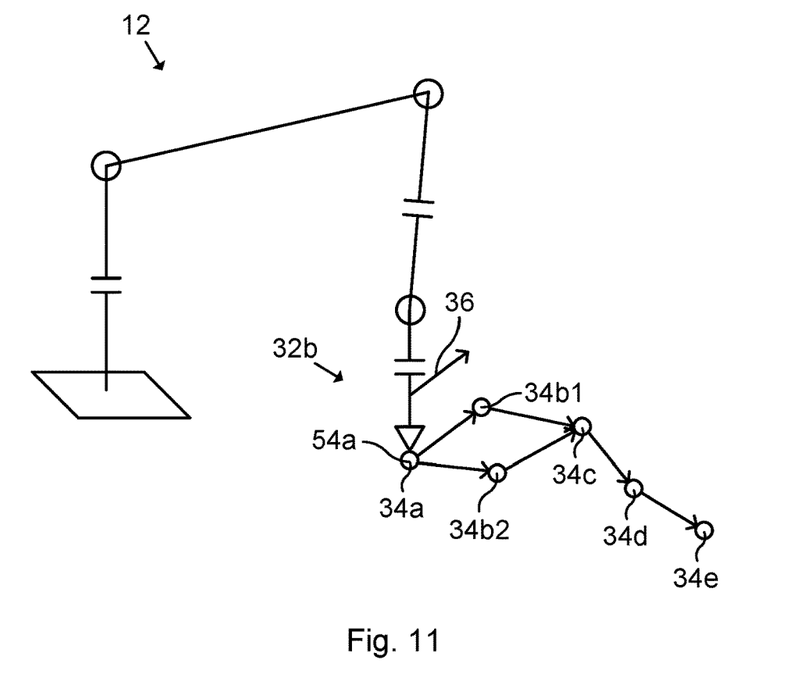
FIG. 11: schematically represents the industrial actuator moving in a forward direction along an alternative movement path.

FIG. 11 schematically represents the industrial robot 12 moving in a forward direction 36 along an alternative movement path 32b. Mainly differences with respect to FIGS. 1-10 will be described. In FIG. 11, the industrial robot 12 moves automatically in the forward direction 36 along the movement path 32b in accordance with a robot program, e.g. implemented in the computer program of the control system 14.

The movement path 32b in FIG. 11 comprises a first target position 34a, a primary second target position 34b1, a secondary second target position 34b2, a third target position 34c, a fourth target position 34d and a fifth target position 34e. One, several or all of the target positions 34a, 34b1, 34b2, 34c, 34d and 34e may also be referred to with reference numeral "34".

When the industrial robot 12 is in the first target position 34a, as shown in FIG. 11, the first target position 34a is recorded as a first actual position 54a. That is, the axis position of each axis 20a-20f are recorded as the first actual position 54a.

Moreover, when the industrial robot 12 is in the first target position 34a, the forward direction 36 along the movement path 32b is either to the primary second target position 34b1, or to the secondary second target position 34b2. The determination of whether the industrial robot 12 should move to the primary second target position 34b1 or to the secondary second target position 34b2 is made based on a conditional statement, such as an if-statement in the robot program. According to one non-limiting example, the industrial robot 12 may move from the first target position 34a to the primary second target position 34b1 if the secondary second target position 34b2 is occupied, e.g. by means of an external device (not shown). Conversely, the industrial robot 12 may move from the first target position 34a to the secondary second target position 34b2 if the primary second target position 34b1 is occupied. In FIG. 11, the robot program decides that the industrial robot 12 should proceed from the first target position 34a to the primary second target position 34b1.

Figure 12:
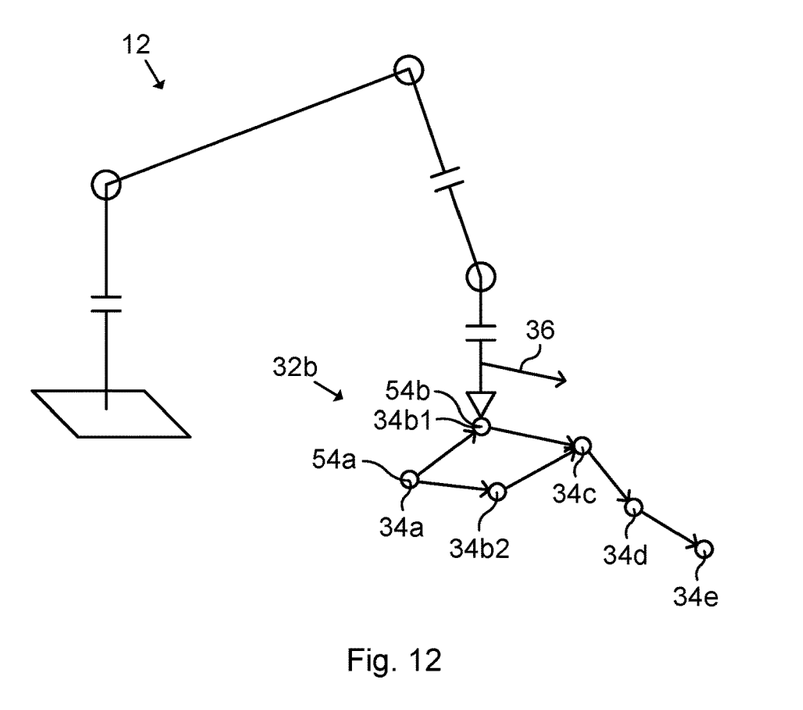
FIG. 12: schematically represents the industrial actuator during further movement in the forward direction along the movement path in FIG. 11.

FIG. 12 schematically represents the industrial robot 12 during further movement in the forward direction 36 along the movement path 32b. In FIG. 12, the industrial robot 12 has reached the primary second target position 34b1. The primary second target position 34b1 is recorded as a second actual position 54b.

Figure 13:
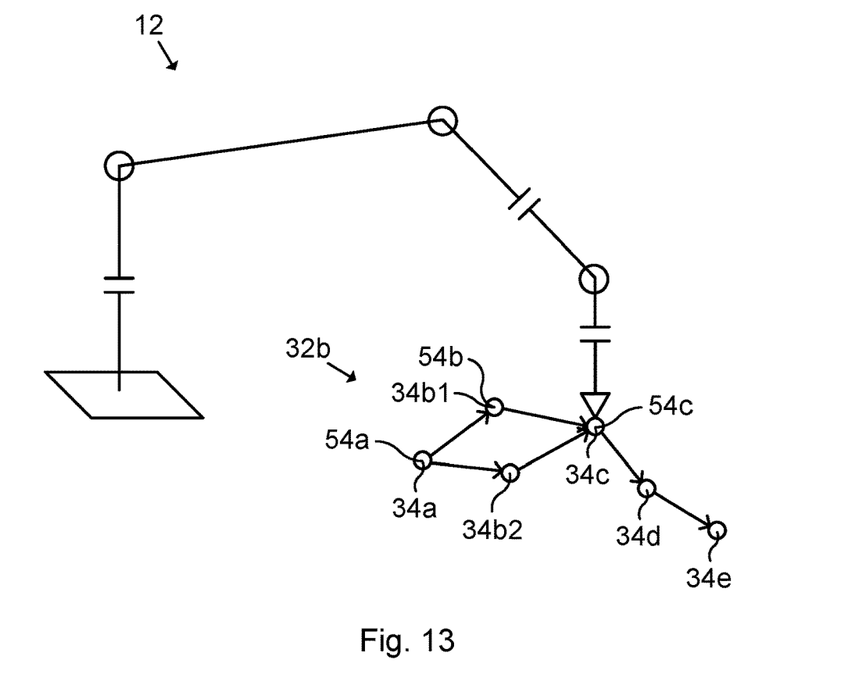
FIG. 13: schematically represents the industrial actuator during a stop along the movement path in FIGS. 11 and 12.

FIG. 13 schematically represents the industrial robot 12 during a stop along the movement path 32b. In FIG. 13, the industrial robot 12 has reached the third target position 34c. The third target position 34c is recorded as a third actual position 54c. One, several or all of the actual positions 54a-54c may also be referred to with reference numeral "54". A plurality of actual positions 54 of the industrial robot 12 are thus recorded as the industrial robot 12 moves along the movement path 32b in the forward direction 36. This functionality may be referred to as a path recorder. The path recorder may record the n last target positions 34 actually obtained by the industrial robot 12, where n is a positive integer. n may for example be at least 10, such as at least 20. The path recorder may be active as default when automatically executing the robot program.

When the industrial robot 12 is in the third target position 34c, the execution of the robot program stops. The stop may be caused by various reasons. The stop may for example be automatically performed if the industrial robot 12 experiences a collision, and the control of the industrial robot 12 along the movement path 32b by means of the input element 30a-30d may consequently be automatically activated.

In FIG. 13 however, the user provides a manual activation input to activate the control of the industrial robot 12 by means of the input element 30a-30d according to FIGS. 1-10. In response to the manual activation input, the industrial robot 12 stops. The manual activation input can be provided to the teach pendant unit 16.

According to one illustrative example, the industrial robot 12 may have stopped with the end effector 22 deep inside a vehicle body (not shown). In this case, it is very difficult to jog the industrial robot 12 out from the vehicle body by means of an axis-by-axis motion mode or a coordinate system motion mode.

Figure 14:
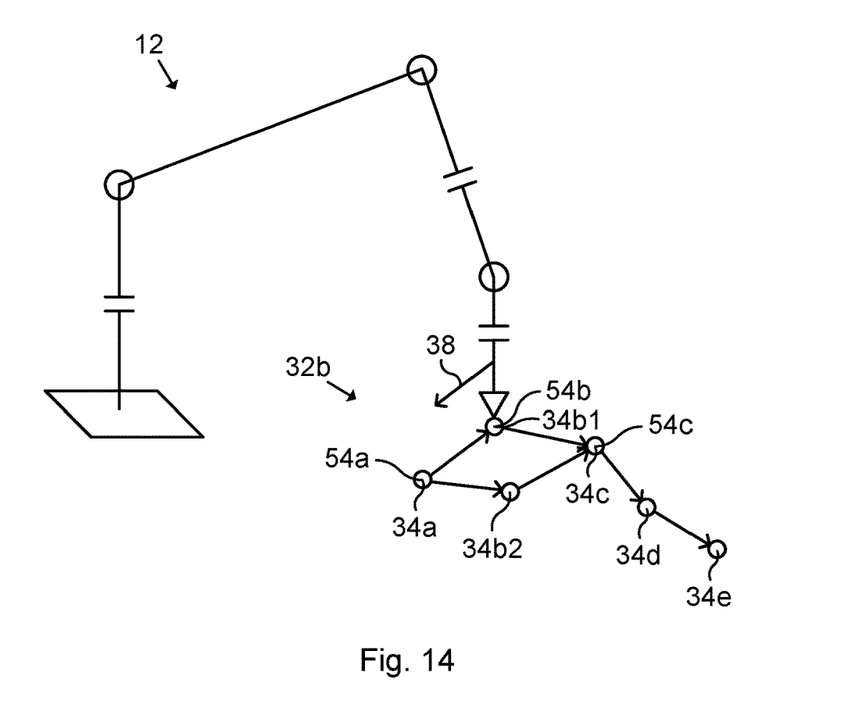
FIG. 14: schematically represents the industrial actuator moving in a backward direction along the movement path in FIGS. 11-13.

FIG. 14 schematically represents the industrial robot 12 moving in a backward direction 38 along the movement path 32b by means of manual manipulation of the input element 30a-30d as described with reference to FIGS. 1-10. When moving in the backward direction 38 along the movement path 32b, the industrial robot 12 is controlled to move successively between the actual positions 54 in the backward direction 38. All axes 20 move in reverse when the industrial robot 12 moves from the third target position 34c to the primary second target position 34b1, in comparison with when moving from the primary second target position 34b1 to the third target position 34c.

Since the movement in the backward direction 38 along the movement path 32b is based on the actual positions 54 comprising axis positions, the industrial robot 12 can be reversed along the same movement path 32b and with the same axis movements as when moving in the forward direction 36 along the movement path 32b. In the example above with the vehicle body, since the industrial robot 12 has used a set of movements to move into the vehicle body, the same set of movements are reversed to move the industrial robot 12 out from the vehicle body. Thus, with the control of the industrial robot 12 by means of the input element 30a-30d as described herein, the industrial robot 12 can easily be retracted from complicated postures within narrow spaces.

Once the user is finished with the control of the industrial robot 12 along the movement path 32b by means of the input element 30a-30d, the user may provide a manual resuming input to the teach pendant unit 16. In response to the manual resuming input, the execution of the robot program is resumed from the current position of the industrial robot 12.

Figure 15:
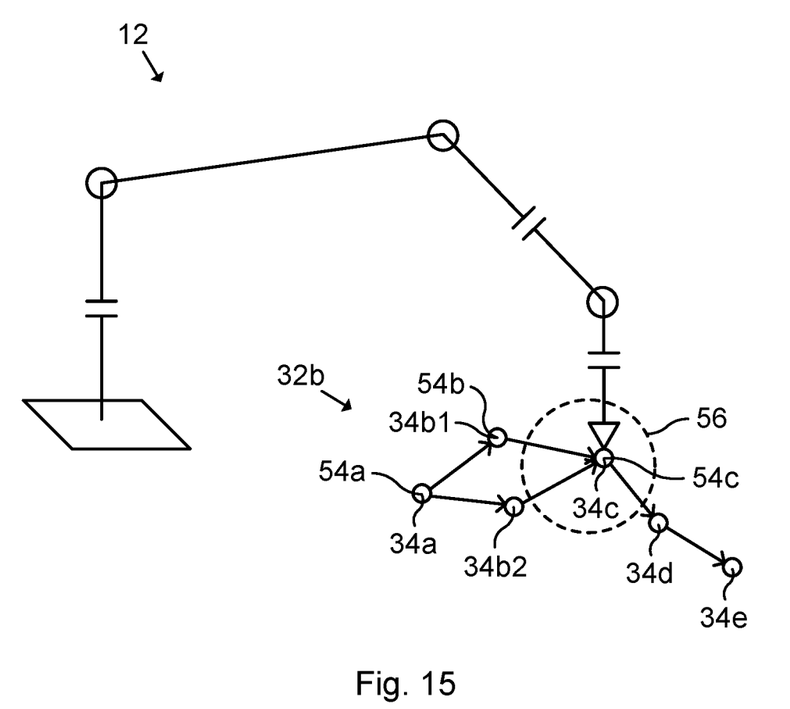
FIG. 15: schematically represents the industrial actuator during a stop within a safe zone.

FIG. 15 schematically represents the industrial robot 12 during a stop within a safe zone 56. The safe zone 56 is defined as a volume within the workspace of the industrial robot 12. When the industrial robot 12 reaches the safe zone 56 during automatic execution of the robot program, the industrial robot 12 automatically stops. In this example, the control of the industrial robot 12 by means of the input element 30a-30d is automatically activated upon this automatic stop within the safe zone 56. The user can now manually control the movement of the industrial robot 12 back and forth along the movement path 32b within the safe zone 56 by means of manual manipulation of the input element 30a-30d as described above.

While the present disclosure has been described with reference to exemplary embodiments, it will be appreciated that the present invention is not limited to what has been described above. For example, it will be appreciated that the dimensions of the parts may be varied as needed. Accordingly, it is intended that the present invention may be limited only by the scope of the claims appended hereto.

The invention claimed is:

1. A method of controlling an industrial actuator, the method comprising:
 receiving a manual input in the form of a displacement of an input element, the input element being movable in each of a first input direction and a second input direction from a neutral position;
 in response to the manual input being a displacement of the input element from the neutral position in the first input direction, controlling the industrial actuator to move in a forward direction along a programmed movement path and with a speed corresponding to a magnitude or a speed of the displacement from the neutral position; and
 in response to the manual input being a displacement of the input element from the neutral position in the second input direction, controlling the industrial actuator to move in a backward direction along the movement path and with a speed corresponding to a magnitude or a speed of the displacement from the neutral position.

2. The method according to claim 1, further comprising:
 controlling the industrial actuator to move along the movement path in the forward direction; and
 recording a plurality of actual positions of the industrial actuator while moving along the movement path in the forward direction;
 wherein the control of the industrial actuator to move in the backward direction along the movement path comprises controlling the industrial actuator to move successively between the actual positions.

3. The method according to claim 2, wherein the industrial actuator comprises a plurality of axes, and wherein each actual position of the industrial actuator includes an axis position for each axis.

4. The method according to claim 2, further comprising stopping the industrial actuator in response to the input element being in the neutral position.

5. The method according to claim 2, wherein the input element is a joystick, a slider, or a knob.

6. The method according to claim 2, wherein the input element is linearly movable in each of the first input direction and the second input direction from the neutral position.

7. The method according to claim 1, further comprising stopping the industrial actuator in response to the input element being in the neutral position.

8. The method according to claim 1, wherein the input element is a joystick, a slider, or a knob.

9. The method according to claim 1, wherein the input element is linearly movable in each of the first input direction and the second input direction from the neutral position.

10. The method according to claim 1, wherein the input element is rotatable in each of the first input direction and the second input direction from the neutral position.

11. The method according to claim 1, further comprising receiving a manual activation input, and activating the control of the industrial actuator in response to receiving the manual activation input.

12. The method according to claim 1, further comprising receiving a manual resuming input, and controlling the industrial actuator to move from a current position along the movement path in accordance with a program in response to receiving the manual resuming input.

13. The method according to claim 1, further comprising automatically activating the control of the industrial actuator when the industrial actuator experiences a collision.

14. The method according to claim 1, further comprising automatically activating the control of the industrial actuator when the industrial actuator stops within a safe zone.

15. The method according to claim 1, further comprising visualizing the movement path, and at least one of the forward direction and the backward direction in association with the movement path.

16. The method according to claim 1, further comprising visualizing the movement path, the forward direction, the backward direction, the first input direction and the second input direction.

17. A control system for controlling an industrial actuator, the control system comprising at least one data processing device and at least one memory having a computer program stored thereon, the at least one computer program including program code which, when executed by the at least one data processing device, causes the at least one data processing device to perform the method steps of:
- receiving a manual input in the form of a displacement of an input element, the input element being movable in each of a first input direction and a second input direction from a neutral position;
- in response to the manual input being a displacement of the input element from the neutral position in the first input direction, controlling the industrial actuator to move in a forward direction along a programmed movement path and with a speed corresponding to a magnitude or a speed of the displacement from the neutral position; and
- in response to the manual input being a displacement of the input element from the neutral position in the second input direction, controlling the industrial actuator to move in a backward direction along the movement path and with a speed corresponding to a magnitude or a speed of the displacement from the neutral position.

18. An industrial actuator system comprising a control system:
- at least one data processing device and at least one memory having a computer program stored thereon, the at least one computer program including program code which, when executed by the at least one data processing, device causes the at least one data processing device to perform the method steps of:
- receiving a manual input in the form of a displacement of an input element, the input element being movable in each of a first input direction and a second input direction from a neutral position;
- in response to the manual input being a displacement of the input element from the neutral position in the first input direction, controlling the industrial actuator to move in a forward direction along a programmed movement path and with a speed corresponding to a magnitude or a speed of the displacement from the neutral position;
- in response to the manual input being a displacement of the input element from the neutral position in the second input direction, controlling the industrial actuator to move in a backward direction along the movement path and with a speed corresponding to a magnitude or a speed of the displacement from the neutral position;

and an industrial actuator.

19. The industrial actuator system according to claim 18, further comprising a teach pendant unit, wherein the teach pendant unit includes the input element.

* * * * *